United States Patent
Ray et al.

(10) Patent No.: US 6,273,439 B1
(45) Date of Patent: Aug. 14, 2001

(54) SCOOTER

(75) Inventors: Paula G. Ray, Owosso, MI (US); Ulrich Trojer, Poecking (DE)

(73) Assignee: Stride Glide, LLC, Owosso, MI (US)

( * ) Notice: Subject to any disclaimer, the term of this patent is extended or adjusted under 35 U.S.C. 154(b) by 0 days.

(21) Appl. No.: 09/347,941

(22) Filed: Jul. 6, 1999

(51) Int. Cl.$^7$ ................................. B62M 1/00; B62C 1/02
(52) U.S. Cl. .................. 280/87.041; 280/63; 280/87.021
(58) Field of Search ................................ 280/87.041, 63, 280/87.021, 294, 293, 229, 87.042, 267, 87.03

(56) References Cited

U.S. PATENT DOCUMENTS

| | | |
|---|---|---|
| D. 295,989 | 5/1988 | Cummings . |
| D. 300,756 | 4/1989 | Cummings . |
| D. 392,001 | 3/1998 | Chen . |
| 1,664,858 * | 4/1928 | Headley ........................ 280/87.041 |
| 1,689,916 * | 10/1928 | Fisher ............................ 280/87.041 |
| 1,844,305 * | 2/1932 | White ............................. 280/87.041 |
| 3,336,046 * | 8/1967 | Seiling ............................ 280/87.041 |
| 4,799,701 * | 1/1989 | Lindau et al. .................. 280/87.041 |
| 5,039,121 * | 8/1991 | Holter ............................ 280/87.041 |
| 5,183,129 | 2/1993 | Powell . |
| 5,470,089 | 11/1995 | Whitson . |
| 5,899,474 * | 5/1999 | Grutzik ......................... 280/87.041 |
| 5,954,349 * | 9/1999 | Rutzel ............................ 280/87.041 |
| 5,992,864 * | 11/1999 | Dickson et al. ............... 280/87.041 |
| 6,120,044 * | 9/2000 | Tsai ................................ 280/87.041 |

* cited by examiner

Primary Examiner—Lanna Mai
Assistant Examiner—Jeffrey J. Restifo
(74) Attorney, Agent, or Firm—Robert H. Frantz

(57) ABSTRACT

A scooter having a streamlined design and a proportioned frame suitable for high-speed operation by tall and heavy riders, such as adults. The scooter includes a frame having a down tube which forms an angle of approximately 110 degrees with a horizontal rider deck and having a head tube mounted at an approximate angle of 40 degrees to the down tube allows for the front steerable wheel to be safely operated in turns at higher speeds of travel by maintaining a near-vertical position of the front wheel with respect to the ground.

8 Claims, 3 Drawing Sheets

SCOOTER

TECHNICAL FIELD OF THE INVENTION

This invention pertains to the field of manually-powered vehicles, such as bicycles, scooters, and skateboards. This invention also pertains to health equipment, such as exercise bicycles.

CROSS-REFERENCE TO RELATED APPLICATIONS

Not applicable.

FEDERALLY SPONSORED RESEARCH AND DEVELOPMENT STATEMENT

This invention was not developed in conjunction with any Federally-sponsored contract.

MICROFICHE APPENDIX

Not applicable.

BACKGROUND OF THE INVENTION

Scooters and scooter-like manually-powered vehicles are well known within the art for efficient means for transportation. Most scooters are designed and manufactured primarily for recreational use by children, while some scooters are designed for use by adults. Scooters are propelled by the rider using a single stride with one leg, while the other leg and foot maintain contact with the rider platform.

Many scooters of the prior art employ small wheels at the front and/or rear ends of the scooters, such as the designs disclosed in U.S. design Pat. Nos. 300,756; 295,989; and 392,001. Scooters with small wheels are not particularly well suited for use by taller and/or heavier operators, such as adults of 5 to 6 feet in height and up to 250 pounds in weight. The smaller wheels are difficult to keep rolling at a steady speed over uneven surfaces. Further, the frames of many scooters are not designed to support the stresses incurred during use by heavier operators and during higher speed operation.

Typical scooters, like bicycles, are not convenient to store, and cannot be carried indoors for storage easily due to the large frame and handle bar dimensions necessary. The scooter disclosed in U.S. Pat. No. 5,183,129 to Powell, collapses, but the overall design requires significant mechanical complexity and weight, making it unsuitable for high speed use and long-term carrying.

The scooter disclosed in U.S. Pat. No. 5,470,089, to Whitson, et al, is suitable for adult use and discloses larger wheels. The Whitson scooter uses wheels of 2:1 to 3:1 ratio of wheel diameter to the length of the scooter frame. The Whitson scooter also uses a front wheel fork which is tilted at a 30 degree incline from vertical, which allows the scooter frame down rod to descend from the head tube at a nearly vertical angle, thus forming a nearly right angle with the rider platform.

However, the Whitson scooter is not suitable for taller operators and higher speed operation. As the scooter is operated at higher speeds, the rider's propulsion leg will swing a greater horizontal distance, reaching further forward at the beginning of the stride, and continuing further backward towards the end of the stride. Taller riders have longer legs, thus increasing the stride length. The Whitson scooter may pose a hazard to such operation when the front wheel and yoke are turned towards the propulsion leg, as the rider's foot and/or leg may come in contact with the front wheel and front wheel spokes. This poses a potential injury hazard to both the rider and nearby persons Further, the Whitson scooter's 30 degree front fork causes the front wheel to tilt significantly from a straight vertical orientation during turns, which also poses a potential for the rider to lose balance and wreck the scooter.

Therefore, there exists a need in the art for a scooter which is properly constructed to withstand the stresses and weight for a full-size adult operator propelling the unit at a relatively high speed. There also exists a need in the art for a high-performance steering system design which maintains the front steering wheel in a nearly vertical position during high speed turns, to increase stability and maneuverability. Further, there exists a need in the art for a scooter which presents no overall protrusions, including a turned wheel, which may come in contact with the rider's legs during normal operation, in order to enhance safety of operation. Finally, there exists a need in the art for an enhanced scooter which can be collapsed, and whose design is simple and light weight to lend itself to low-cost manufacturing and long-term carrying in the collapsed position.

SUMMARY OF THE INVENTION

The present invention, an improved scooter design, meets and exceeds the requirements and needs as set forth in the background of the invention through specific design features, construction techniques, and component materials.

The angles of the down tube, the head tube, and the rear fork are specifically designed to enhance the ergonomics of the scooter when being operated by taller adult riders, and when being operated at high speeds. The combination angles of the down tube and the head tube allow the front wheel fork to descend at a close-to-vertical angle, thus enhancing the handling and maneuvering of the scooter at high and low speeds by reducing the tilt angle of the front wheel during turns.

Choices of construction materials as well as construction techniques employed enhance the load rating of the scooter while simultaneously reducing the manufacturing cost and complexity.

Finally, several design features, such as the placement of the brakes, streamline the overall frame design and reduce protrusions from the frame. This allows for safer operation at higher speeds with longer rider stride lengths.

BRIEF DESCRIPTION OF THE DRAWINGS

The figures presented herein when taken in conjunction with the disclosure form a complete description of the invention.

DETAILED DESCRIPTION OF THE INVENTION

The scooter is provided with a steerable front wheel, a rear wheel, and a frame therebetween. The steerable front wheel is controlled by a handle bar.

Figure 1:
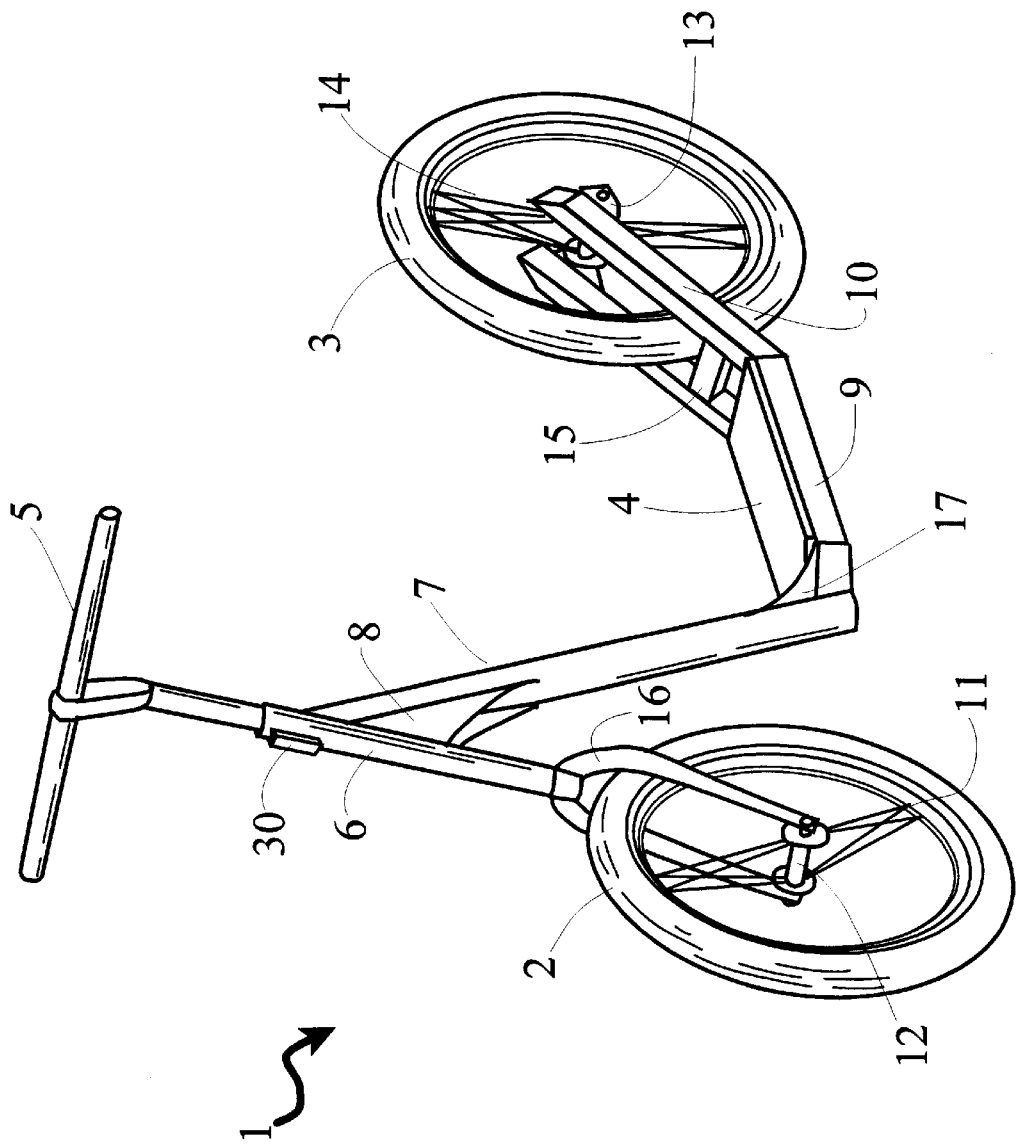
FIG. 1 presents a perspective view of the scooter.

Turning to FIG. 1, the scooter (1) is comprised of a front wheel assembly (2), a rear wheel assembly (3), a frame between the front and rear wheel assemblies, and a generally T-shaped handle bar. The front wheel assembly (2) consists of a standard bicycle wheel assembly, and preferably a 20-inch high-pressure tire and rim. The wheel rim is suspended typically from a front axle (12) by a system of radial spokes (11), such as wire spokes or composite spokes. These kinds of wheel assemblies are well known within the art. The rear wheel assembly (3) likewise comprises a standard bicycle-type 20-inch high-pressure tire and rim, with spokes (14) and a rear axle (13). Optionally, disc covers may be added to the wheel assembly to cover the spokes and prevent accidental contact by the rider during operation of the scooter.

The lower portion of the T-shaped handle bar (5) is received into the top of a head tube (6) located at the front of the scooter frame, similar to ordinary bicycle designs. A front fork (16) extends downward and towards the front of the scooter from the bottom of the head tube (6), and suspends the front wheel assembly (2) via the front wheel axle (12).

A down tube (7) descends from the head tube (6) to the front portion of a deck frame (9). The deck frame preferably consists of two substantially parallel members adjoined by two or more cross members. On the top of the deck frame is a rider's deck (4), on which the rider or operator places and rests one of his or her feet. A rear fork (10) extends upwardly and rearwardly from the rear portion of the deck frame to support the rear wheel assembly (3) via the rear axle (13).

To achieve the objects of the invention, the design incorporates several structural features. In order to strengthen the frame to endure the stresses and demands of larger, heavier riders operating the scooter at higher speeds, an upper set of frame reinforcements (8) and lower set of frame reinforcements (17) are attached to the frame as shown in FIG. 1. The upper reinforcements (8) and lower reinforcements (17) are preferably constructed of plate metal and welded to the head tube (6), down tube (7) and deck frame members (9). Additionally, the deck frame members (9) and rear fork members (10) are constructed of square metal tube stock instead of the traditional round tube stock, which significantly strengthens the frame. The rider's deck (4) is preferably constructed of metal plate and welded to the deck frame members (9).

Further, the major frame members, such as the front fork (16), the head tube (6), the down tube (7), the deck frame members (9) and the rear fork (10) are constructed preferably of chromalloy metal tube stock, and welded to each other at their respective joints.

Figure 2:
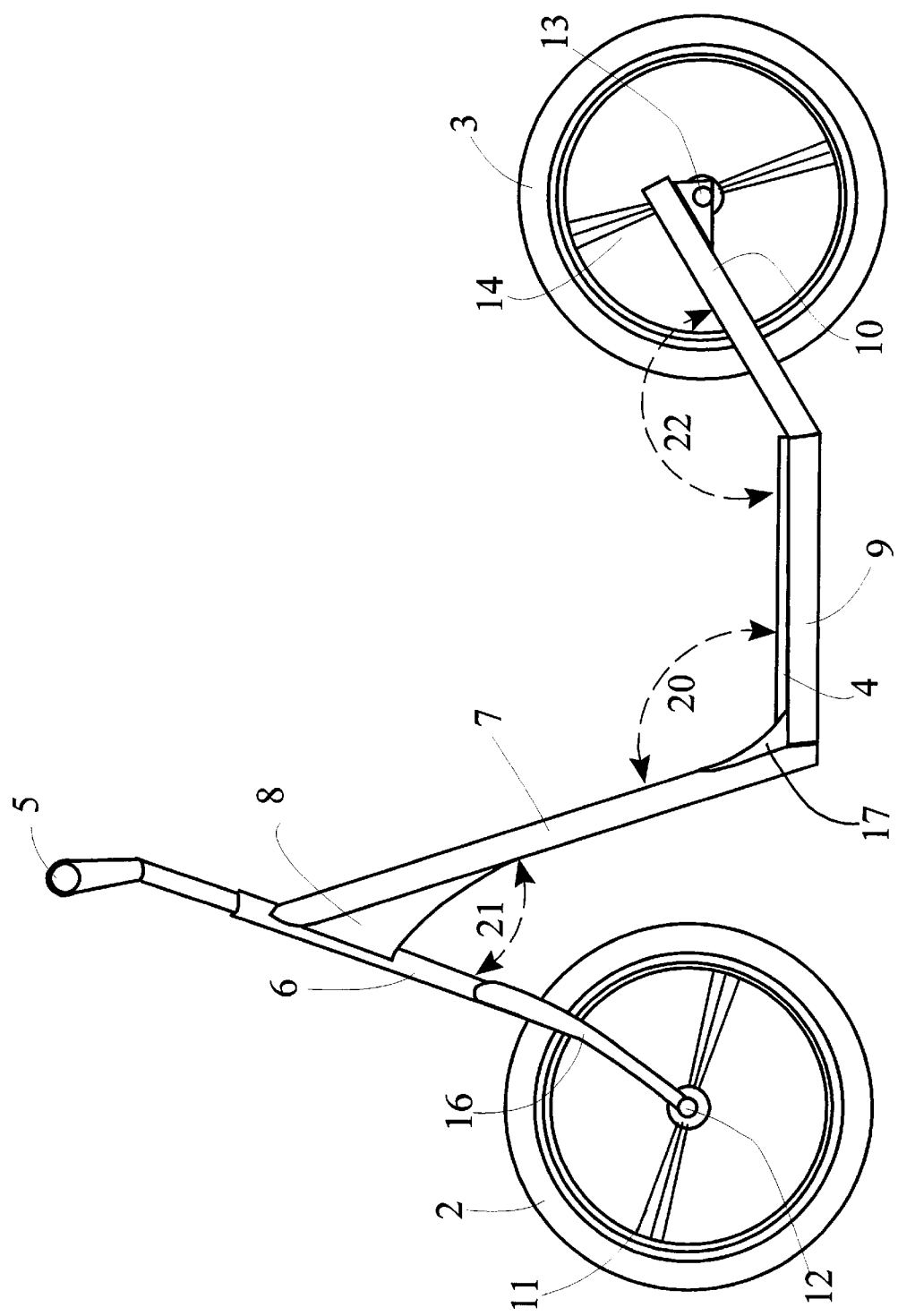
FIG. 2 discloses a side view of the invention.

FIG. 2 illustrates the three critical angles in the frame construction which enable the scooter to achieve better and safer handling by the larger, heavier riders, even at higher speeds of operation. The rider's deck is positioned 4.5 to 5.5 inches from the ground, and approximately level and horizontal. The down tube forms a 110-degree angle (20) with the rider's deck, which places the head tube well in front of the front edge of the rider's deck. Because the head tube is well in front of the rider's deck, the head tube can descend from the upper end of the down tube at an angle closer to vertical than the prior art scooters. In the preferred embodiment, the head tube forms an approximate 40-degree angle (21) with the down tube, or approximately 20 degrees from straight vertical. This allows the front wheel assembly to maintain a more vertical position with respect to the ground as the wheel is turned during steering, thereby improving the high-speed steering characteristics of the scooter and reducing the likelihood that a rider's propulsion leg may come in contact with the turned front wheel.

The rear fork members (10) form a 145-degree angle (22) with the horizontal rider's deck frame (9), which positions the 20-inch rear wheel assembly further back from the rider's deck than the prior art scooters. All of these design features, including the relatively straight design of the scooter along the sides of the frame, accumulate to a safer scooter with minimized chance for contact of the striding leg of the rider.

In a further refined embodiment of the scooter, bicycle-style brakes are provided on the rear wheel assembly (3), such as BMX caliper brakes, V-brakes, disk or drum brakes. The brakes may be mounted underneath the rear fork members (10) towards the front edge of the rear wheel assembly (3), thus reducing the risk of the rider's striding leg contacting the brakes. A standard slip cable is routed underneath the rider's deck (4), up the down tube (7) and finally to the handle bars (5) where it terminates at a squeezable brake control similar to those used on bicycles. These types of brakes are well known within the art, but the placement of the brakes beneath the rear forks on the rear wheel is an inventive improvement which enhances the safety of the scooter.

Figure 3A:
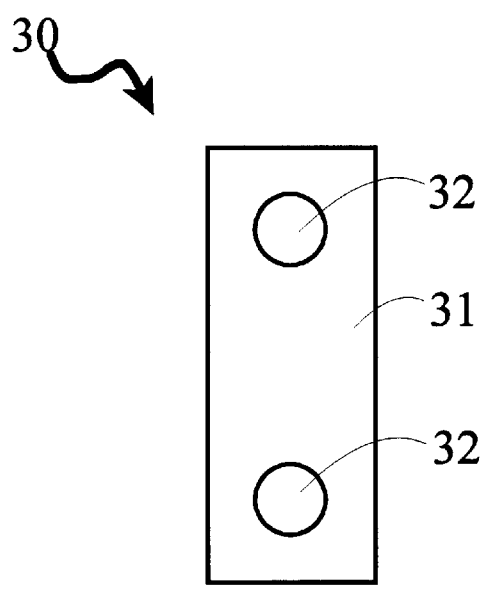
FIGS. 3a, 3b and 3c show an optional accessory bracket for mounting on the head tube of the scooter, allowing a basket or other accessory to be attached to the scooter.
Figure 3B:
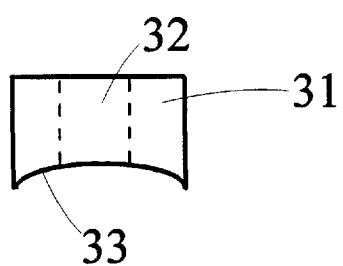
Figure 3C:
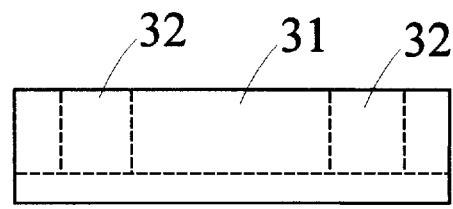

FIGS. 3a, 3b and 3c disclose the design of an accessory bracket (30) for mounting on the head tube (6). FIG. 3a shows a frontal view of the bracket, which can be fabricated of a solid block (31) of metal or plastic having approximate dimensions preferably of 1.732 inches in height by 0.591 inches in width. Two mounting holes (32) provide attachment points for retention of the accessory, such as a basket, to the bracket The mounting holes (32) are preferably 0.276 inches in diameter, and are formed through the thickness of the bracket as shown in FIG. 3c. The bracket is attached to the scooter head tube (6) by welding, glue or other suitable means known within the art. The rear face (33) of the bracket which contacts the head tube (6) is preferably concave as shown in FIG. 3b so as to match the contour of the front surface of the head tube, thereby providing a tight fit to the head tube.

While the disclosure contained herein has set forth a preferred embodiment of the invention and an alternative embodiment, it will be appreciated by those skilled in the art that variations to the disclosed embodiments can be made without departing from the scope and spirit of the invention.

What is claimed is:

1. A manually-powered scooter for transportation of and operation by a human rider comprising:

a front wheel assembly having a rotatable front axle, a front wheel rim of about 20 inches in diameter, a front wheel suspension means disposed between said front axle and said front wheel rim, and a front wheel tire disposed around said front wheel rim for contacting the ground and steering the travel of the scooter;

a front wheel fork having a front right side member with an upper and lower end, and having a front left side member having an upper and a lower end, said front right side member and said front left side member being adjoined to each other at said top end of said front left and right side members, forming a fork assembly with said front wheel assembly being disposed between said front fork members and suspended by interconnection to said front axle;

a round head tube having an upper end and a lower end, and being substantially hollow;

a T-shaped handle bar assembly having a left handle and a right handle, and having a round vertical portion of suitable diameter to be rotatably received into said hollow head tube extending from said upper end of said head tube and extending through said head tube such that said front wheel fork is immovably affixed to said vertical portion of the handle bar thus allowing operator control of the rotated position of the front wheel fork and front wheel assembly;

a substantially straight round down tube descending diagonally from and rigidly affixed to said head tube and forming an angle of about 40 degrees with said head tube, said down tube having a lower end;

a first and a second square deck support members, said first and second deck support members being disposed substantially parallel to each other and spaced apart, said deck members being rigidly interconnected to each other to form an integral horizontal rider deck, said rider deck having a front end and a rear end, said rider deck front end being interconnected to said lower end of said down tube and forming an angle of about 110 degrees with said down tube;

a rear fork assembly comprised of two substantially parallel square members ascending at a front end of the fork assembly from said rear end of said rider deck at an angle of about 145 degrees, and having a rear end of said rear fork assembly suitable for receiving a wheel axle; and a rear wheel assembly disposed between said rear fork assembly members, said rear wheel assembly being comprised of a rotatable rear axle, a rear wheel rim having a diameter of about 20 inches, a set of rear wheel suspension spokes disposed between said rear axle and said rear wheel rim, and a rear wheel tire disposed around said rear wheel rim for contacting the ground and supporting the scooter.

2. The scooter of claim 1 wherein said front wheel assembly and said rear wheel assembly is a bicycle-style high-pressure tire and wheel assembly.

3. The scooter of claim 1 wherein said head tube is constructed of chromalloy metal.

4. The scooter of claim 1 wherein said down tube is constructed of chromalloy metal.

5. The scooter of claim 1 wherein said deck support members are constructed of chromalloy metal.

6. The scooter of claim 1 wherein said rear fork assembly is constructed of chromalloy metal.

7. The scooter of claim 1 further comprising an accessory bracket mounted to said head tube.

8. The scooter of claim 7 wherein said accessory bracket is specifically adapted for receiving a removable basket accessory.

* * * * *